Aug. 26, 1958  P. LUSTRIK  2,848,918
TOOL POST AND HOLDER
Filed Nov. 15, 1954
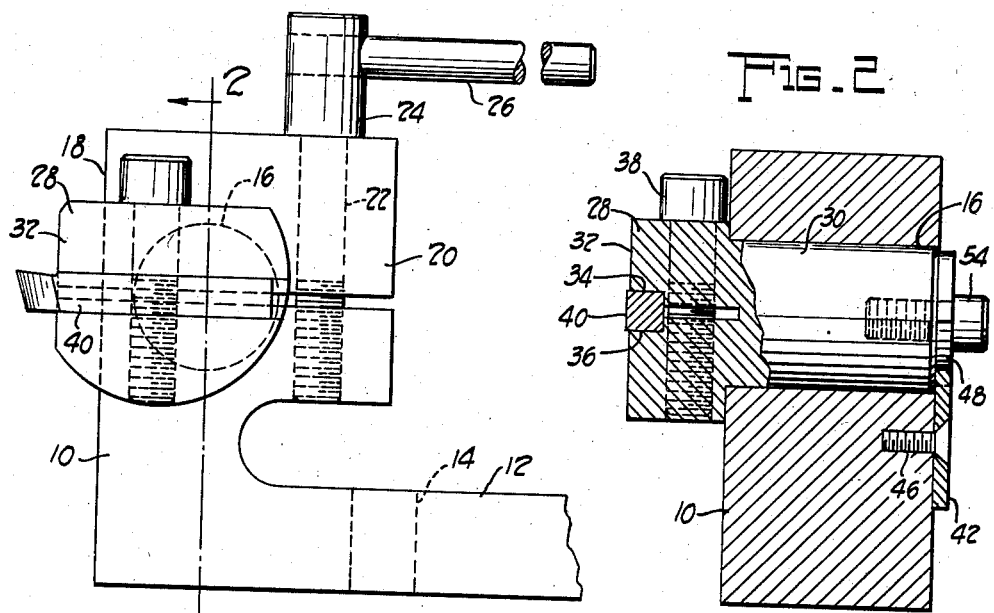
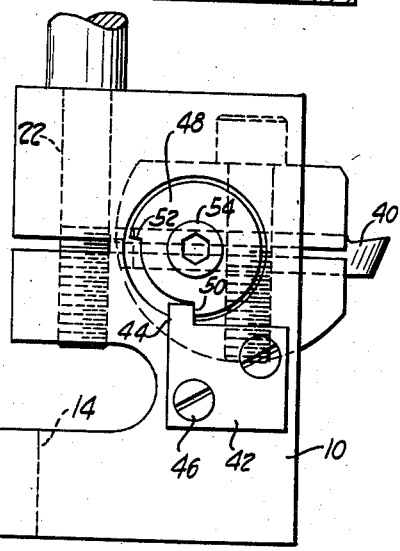
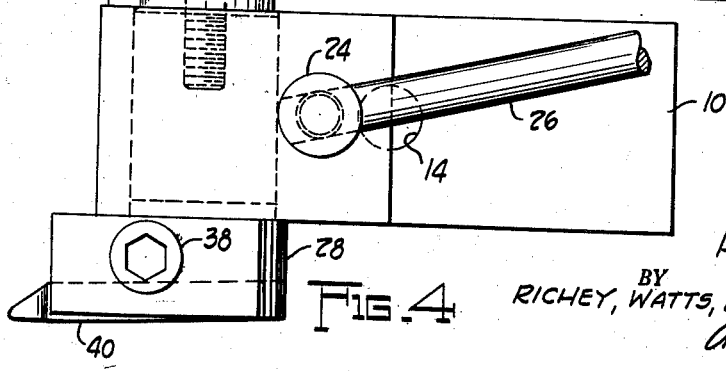
INVENTOR.
PETER LUSTRIK
BY RICHEY, WATTS, EDGERTON & McNENNY
A. H. Edgerton,
ATTORNEYS

United States Patent Office 2,848,918
Patented Aug. 26, 1958

2,848,918

TOOL POST AND HOLDER

Peter Lustrik, Cleveland, Ohio, assignor to Lustrik Tool Company, Cleveland, Ohio, a corporation of Ohio Application November 15, 1954, Serial No. 468,894

2 Claims. (Cl. 82—36)

This invention relates to tool posts for lathes and similar machines and more particularly to interchangeable tool holders for the tool post and cooperating features which make possible a high degree of accuracy in the finished work.

The most important object of this invention is to provide a tool post which will receive and hold a series of tool holders in adjusted position with a minimum of time required for replacing the tool holders.

The rapid finishing of work pieces on which various operations of machining is required depends on the ability of the machine to apply individual tools to the work in rapid succession. Expensive and complicated mechanisms in the form of turrets and the like have been used to accomplish this purpose. This invention contemplates a tool holding device which is simple and may be used with an ordinary low-cost machine. The tool post is adapted to hold a series of tool holders placed therein consecutively and quickly while positively placing the tool in its preadjusted position. By using a single tool post of this type and a plurality of relatively inexpensive tool holders, a series of operations can be performed on the work with little time consumed for changing tools. Therefore, the production rate is comparable to that obtained by a turret lathe or other automatic equipment.

Accordingly, it is an object of this invention to provide a tool post which may be installed on a conventional lathe or a similar machine which will allow the rapid interchange of tools for performing consecutive operations on the work with a high degree of accuracy.

Other objects and advantages more or less ancillary to the foregoing, and the manner in which all the various objects are realized, will appear in the following description, which, considered in connection with the accompanying drawings, sets forth the preferred embodiment of the invention.

Referring to the drawings:

Fig. 1 is a side elevational view of the tool post;

Fig. 2 is a sectional view taken along line 2—2 of Fig. 1;

Fig. 3 is a side elevational view of the tool post; and

Fig. 4 is a plan view of the tool post.

Referring to Fig. 1, a tool post assembly is shown therein having a body 10 with a lateral extending base 12. The base 12 has a drilled opening 14 for receiving a bolt which affixes the tool post to a cross slide or other fixture holding device on a machine tool.

The body 10 has a bore 16 formed therein, the bore 16 being cylindrical and located near one face 18 of the body 10. A portion 20 of the body 10 is split between the bore 16 and the outer surface of the body 10 and material is removed to allow the body 10 to be deformed slightly in order to obtain a clamping action. A bolt 22 extends through the portion 20 and is threaded into the body at the side of the portion 20 adjacent the base 12. The bolt 22 has a head 24 which engages the body 10, a handle 26 being provided for continuously rotating the bolt 22 to obtain the clamping action.

A tool holder 28 having a shank 30 is provided for interchangeable mounting in the tool post assembly. The shank 30 is cylindrical and dimensioned to obtain a sliding fit in the bore 16. The tool holder 28 has a head 32 which forms a shoulder which abuts against the body 10 when the tool holder 28 is in position.

The head 32 is bifurcated and formed to provide confronting shoulders 34 and 36 which may be moved toward and away from each other by the action of a bolt 38 which is threaded into the head 32 at the side of the bifurcation opposite to the head of the bolt 38.

The provision of the shoulders 34 and 36 in the bifurcation allows the clamping action for holding a tool 40 at the extreme end of the tool holder 28 with a portion of the tool 40 projecting beyond the end of the tool holder 28. This feature makes possible the operation of the tool 40 with the work in close proximity to the tool holder 28.

A stop assembly is mounted on the tool holder 28 and the body 10 to establish a preadjusted position of the tool 40 when the tool holder 28 is positioned in the body 10. A stop 42, having a leg 44 formed thereon projects toward the center of the bore 16 in the body 10. The stop 42 is removably affixed to the body 10 by a pair of screws 46. A disk 48 is mounted on the end of the shank 30 and has a portion of the rim cut away to provide shoulders 50 and 52. A bolt 54 extends through the disk 48 and is threaded into the shank 30. The angular position of the shoulder 50 relative to the tool 40 may be adjusted by loosening the bolt 54, rotating the disk 48 to the desired position, and then tightening the bolt 54. When the position of the shoulder 50 has been adjusted and the disk 40 is held firmly in place, the tool holder 28 may be removed and inserted in the body 10 a great many times without losing the adjusted position of the tool 40 and obtaining a high degree of accuracy in the work.

When it is desired to perform more than one operation on the work, a series of tool holders 28 having shanks 30 of uniform size may be placed in the body 10 for consecutive operations. The interchange of tool holders 28 is rapid and the adjustment immediate by virtue of the clamping action on the shank 30 and the preadjusted position of the shoulder 50 on the disk 48.

Although the foregoing description is necessarily of a detailed character in order that the invention may be completely set forth, it is to be understood that the specific terminology is not intended to be restrictive or confining and that various rearrangements of parts and modifications of detail may be resorted to without departing from the scope or spirit of the invention as herein claimed.

I claim:

1. A tool post comprising a body, a cylindrical bore in said body, a tool holder having a cylindrical shank for a sliding fit in said bore, means for deforming said body to clamp said tool holder therein, a shoulder on said tool holder for engagement with said body, thereby locating the tool in respect to said body, stop means adjustably mounted on the end of said tool holder opposite said shoulder, said stop means comprising a member having a radial shoulder formed thereon, and a second stop means affixed to said body comprising an arm projecting across the end of said bore and having a face complementary with and engageable by said radial shoulder on the tool holder stop means.

2. A tool post comprising a body, a cylindrical bore in said body, a tool holder having a cylindrical shank for a sliding fit in said bore, means for deforming said body to clamp said tool holder therein, a shoulder on said tool holder for engagement with said body thereby locating the tool in respect to said body, a stop adjustably mounted on the end of said tool holder opposite said shoulder, said stop being a plate member having a radial shoulder formed thereon, and an arm affixed to said body and projecting across the end of said bore, said arm having a face complementary with and engageable by said radial shoulder on the stop.

References Cited in the file of this patent

UNITED STATES PATENTS

| | | |
|---|---|---|
| 1,361,198 | Strand | Dec. 7, 1920 |
| 1,415,379 | Martin | May 9, 1922 |
| 1,506,034 | Swanson | Aug. 26, 1924 |
| 2,448,309 | Grieco | Aug. 31, 1948 |
| 2,472,255 | Kyle | June 7, 1949 |
| 2,540,568 | Clatfelter | Feb. 6, 1951 |

FOREIGN PATENTS

| | | |
|---|---|---|
| 747,799 | Germany | Oct. 16, 1944 |